US006091160A

United States Patent [19]

Kouchi et al.

[11] Patent Number: 6,091,160

[45] Date of Patent: Jul. 18, 2000

[54] PORTABLE GENERATOR

[75] Inventors: Toshifumi Kouchi; Akira Fukuda, both of Wako-shi, Japan

[73] Assignee: Honda Giken Kogyo Kabushiki Kaisha, Japan

[21] Appl. No.: 09/232,470

[22] Filed: Jan. 15, 1999

[30] Foreign Application Priority Data

Jan. 19, 1998 [JP] Japan .................................. 10-022630

[51] Int. Cl.$^{7}$ ........................................................ H02P 9/04

[52] U.S. Cl. ................................................ 290/1 A; 322/1

[58] Field of Search .................................... 290/1 A, 1 B; 322/1; 310/51

[56] References Cited

U.S. PATENT DOCUMENTS

| | | | |
|---|---|---|---|
| D. 417,651 | 12/1999 | Ohsumi | D13/116 |
| 3,259,752 | 7/1966 | Honda | 290/1 A |
| 4,595,841 | 6/1986 | Yaguchi | 290/1 A |
| 4,608,946 | 9/1986 | Tanaka et al. | 123/2 |
| 4,647,835 | 3/1987 | Fujikawa et al. | 322/1 |
| 4,721,070 | 1/1988 | Tanaka et al. | 123/2 |
| 4,827,147 | 5/1989 | Mizushima | 290/1 A |
| 4,859,886 | 8/1989 | Tanaka et al. | 310/51 |
| 5,121,715 | 6/1992 | Nogami et al. | 123/41.7 |

FOREIGN PATENT DOCUMENTS

| | | |
|---|---|---|
| 1-21399 | 4/1989 | Japan . |

*Primary Examiner*—Nicholas Ponomarenko
*Attorney, Agent, or Firm*—Adams & Wilks

[57] ABSTRACT

A portable generator comprises a shroud for covering at least a crankcase and a cylinder block of an engine thereof. The shroud is formed of split halves. The engine is fixed to the shroud having its upper part connected to a carrying handle of a sound insulating case. As a result, the load of the engine is applied to the carrying handle through the shroud when the portable generator is lifted up with a hand. It is thus not necessary to increase rigidity of the case, thereby enabling lightening of the case. The generator arrangement also provides an improved soundproof effect since the engine, a source of noise, is covered with the shroud and the sound insulating case.

6 Claims, 13 Drawing Sheets

PORTABLE GENERATOR

BACKGROUND OF THE INVENTION

1. Field of the Invention

The present invention relates to an engine and a portable generator having an engine and a generator body driven by the engine and accommodated within a sound insulating case together with the engine.

2. Description of the Related Art

A known portable generator includes an engine and a generator body driven by the engine, both being accommodated within a sound insulating case with a carrying handle provided at an upper part thereof for allowing gripping so that the generator can be hand-carried from one place to another. The sound insulating case needs to have increased rigidity, because it must support the heavy engine and generator body accommodated therein when the generator is lifted up for transportation by an operator's hand holding the carrying handle. However, it is quite difficult to increase rigidity of the sound insulating case without increasing the weight of the latter.

An example portable generator in which this is taken into consideration is proposed in, for example, Japanese Patent Post-Exam Publication No. HEI-1-21399 entitled "PORTABLE GENERATOR". The proposed generator comprises a frame unit consisting of a pair of right and left frame members connected in spaced relation to each other via a lower-positioned bottom cover and an upper-positioned carrying handle, an accommodating case comprised of plural soundproof covers arranged to surround the frame unit, and an engine and a generator body accommodated within the accommodating case.

In the proposed portable generator thus arranged, since rigidity of the accommodating case is increased through the provision of the frame unit, the configuration of the case is restricted by the configuration of the frame unit, whereby freedom in designing the configuration of the case is limited. Further, since the relatively heavy frame unit is employed for increasing the rigidity of the case, there is a room for improvement to substantially reduce the weight of the case including the frame unit.

SUMMARY OF THE INVENTION

It is therefore an object of the present invention to provide a portable generator having a carrying-handle-equipped case for accommodating an engine and a generator body, which case is made light in weight by reducing a burden of load to be born thereby and imparted with increased freedom of designing its configuration.

According to an aspect of the present invention, there is provided a portable generator which comprises an engine, a generator body driven by the engine, a sound insulating case accommodating the engine and the generator body and having a carrying handle, and a cooling and ventilating shroud surrounding at least a crankcase and a cylinder block of the engine, the shroud comprising a split shroud composed of a pair of right and left shroud halves, the engine being fixed to the split shroud, the split shroud having an upper joined portion and a lower joined portion, at least the upper joined portion being accommodated in and connected to the sound insulating case.

In the portable generator, the engine is fixed to the shroud having its upper part connected to the carrying handle formed integrally with an upper part of the case. Therefore, the load of the engine is applied to the carrying handle of the case through the shroud when the portable generator is lifted up with a hand. Thus, it is not necessary to increase rigidity of the case. In other words, by increasing rigidity of only one part of the case, the number of conventional parts required to improve structural rigidity of the case is made small to thereby lighten the case itself. Further, freedom for configuration designing and material selection of the case is not limited by a variety of parts for improving rigidity of the case, thereby improving such freedom. Therefore, the shroud serves as a support member for supporting the engine at the upper part of the sound insulating case. Moreover, since at least a crankcase and a cylinder of the engine are surrounded by the shroud and further accommodated within the case, the portable generator has a double sound insulating structure. Furthermore, since the shroud is composed of a pair of right and left split halves, the engine can be surrounded readily.

Preferably, each of the upper and lower joined portions of the split shroud is accommodated in and connected to the sound insulating case via a vibration-proof member. This is advantageous in that vibration generated upon operation of the engine is attenuated by the vibration-proof member provided at the upper and lower joined portions of the shroud and hence the least vibration is transmitted to the sound insulating case. Further, an under cover, made of a steel plate, for carrying the engine part on the case by means of the vibration-proof member, as required in a conventional arrangement, becomes unnecessary.

Desirably, the split shroud is formed of a steel plate while the sound insulating case is formed of a synthetic resin. This is advantageous in that the split shroud is imparted with rigidity sufficient for supporting the engine and generator body. Further, it becomes possible to reduce the weight of the case and the cost of production of the same.

In a preferred form, the sound insulating case includes a lower part having rigidity larger than that of the other part thereof. This makes it unnecessary to improve the rigidity of the entire case, whereby lightening of the case itself is enabled.

The generator body may be disposed at an entrance side of the shroud. A muffler for the engine may be disposed at an exit side of the shroud. The generator body may comprise a magneto generator having an outer rotor driven by the engine. The generator body may include a cooling fan mounted to the outer rotor for taking external air through an intake port of the case into the shroud and discharging the air from the case after cooling an outer periphery of the engine and then the muffler.

In other words, air introduced into the case through the intake port thereof enters into the shroud through an opening provided inside the case to thereby cool an outer peripheral of the engine and then cool the muffler. Thereafter, the air is discharged from the case through an exhaust port of the case. As a result, it becomes possible to efficiently cool the generator body, the engine and the muffler with the one cooling fan alone.

DETAILED DESCRIPTION OF THE PREFERRED EMBODIMENTS

Certain preferred structural embodiments of the present invention will be described below in greater detail with reference to the accompanying sheets of drawings. In some drawing figures, profiled arrows Fr, Rr, L and R are used to indicated respectively the forward, rearward, leftward and rightward directions of a portable generator 1 embodying the present invention.

Figure 1:
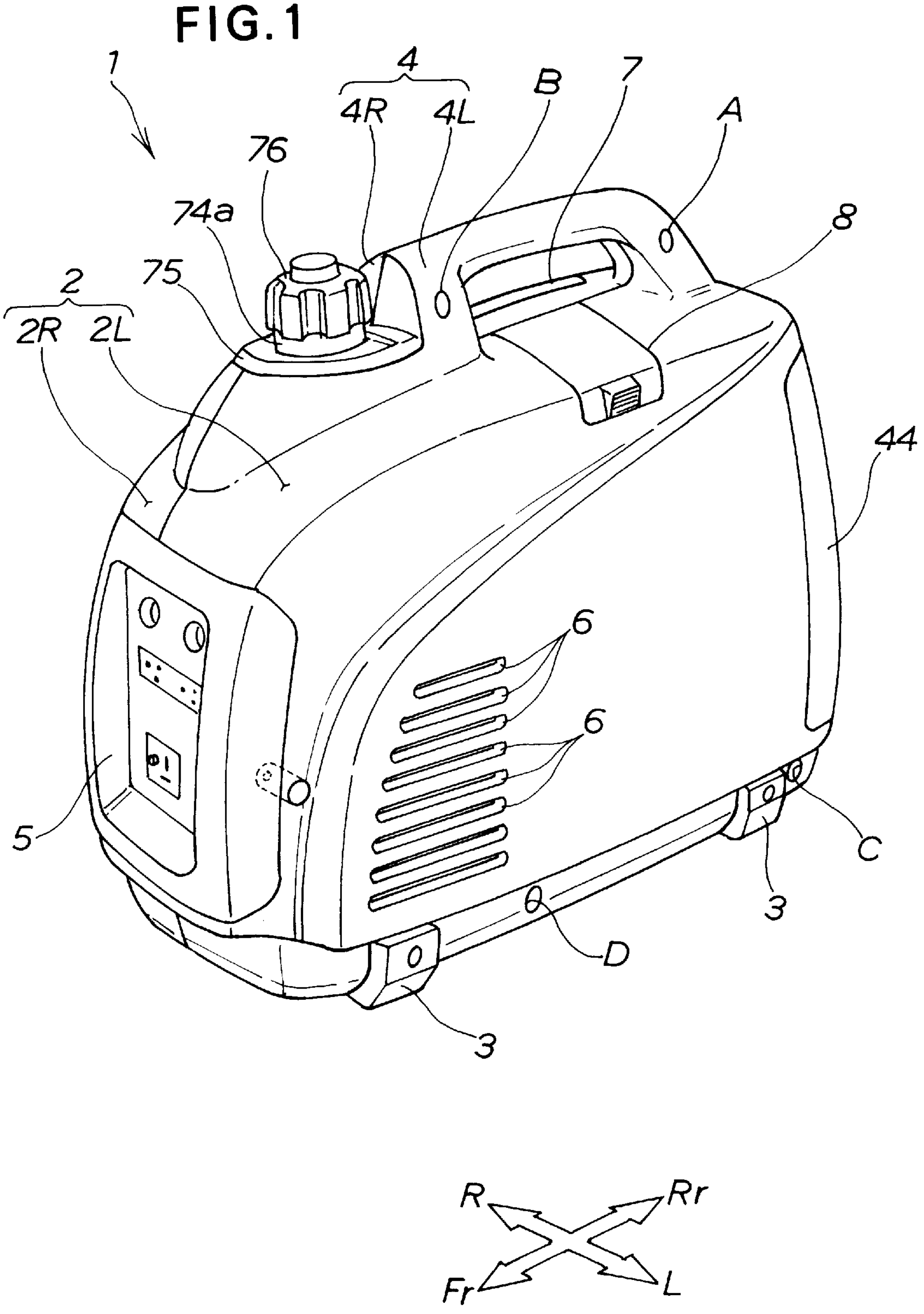
FIG. 1 is a perspective view of a portable generator according to an embodiment of the present invention.

As shown in FIG. 1, the portable generator 1 has a sound insulating case 2. The sound insulating case 2 is made from a synthetic resin and has four legs 3 (two being shown) at the bottom adjacent to respective corners for setting or installation of the portable generator 1. A carrying handle 4 for enabling hand-carrying transportation of the portable generator 1 is formed integrally with a transverse central portion of the upper surface of the sound insulating case 2. The sound insulating case 2 has a front face on which a control panel 5 is provided. A plurality of air inlets 6 are formed in a front portion of each sidewall of the sound insulating case 2 for introducing outside air into the sound insulating case 2.

The sound insulating case 2 including the carrying handle 4 is composed of right and left case halves or members 2R, 2L that can be separated in the widthwise direction along a longitudinal parting line contained in a vertical plane. The right and left case members 2R, 2L are joined together by four screws (not shown), two of which are located at opposite end portions (rear and front end portions) A, B of the carrying handle 4 while the other two screws at a rear end portion C and an intermediate portion D of a lower part of the sound insulating case 2.

The carrying handle 4 has a generally inverted U shape elongated in the longitudinal direction of the sound insulating case 2 to secure adequate hand gripping by the user. The carrying handle 4 is composed of right and left handle halves or members 4R, 4L formed integrally with the right and left case members 2R, 2L, respectively.

In FIG. 1 reference numeral 7 denotes a side cover, and numeral 8 denotes a lid for enabling inspection of a spark plug.

Figure 2:
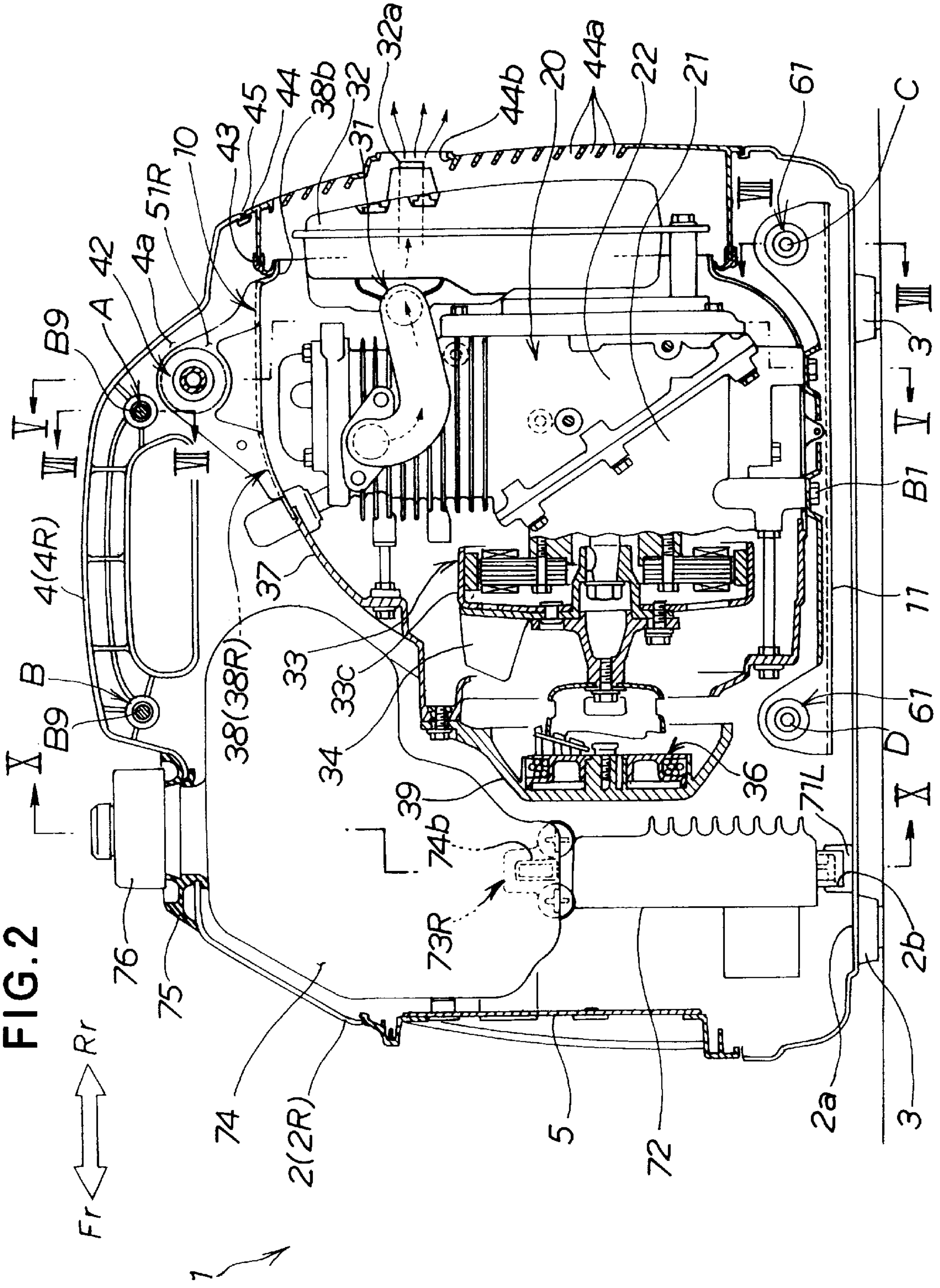
FIG. 2 is a vertical cross-sectional view of the portable generator shown in FIG. 1.

As shown in FIG. 2, the sound insulating case 2 of the portable generator 1 accommodates within it a generator unit 10, a control unit accommodating box 72 and a fuel tank 74. The control unit accommodating box 72 and the fuel tank 74 are disposed forwardly of the generator unit 10.

Figure 3:
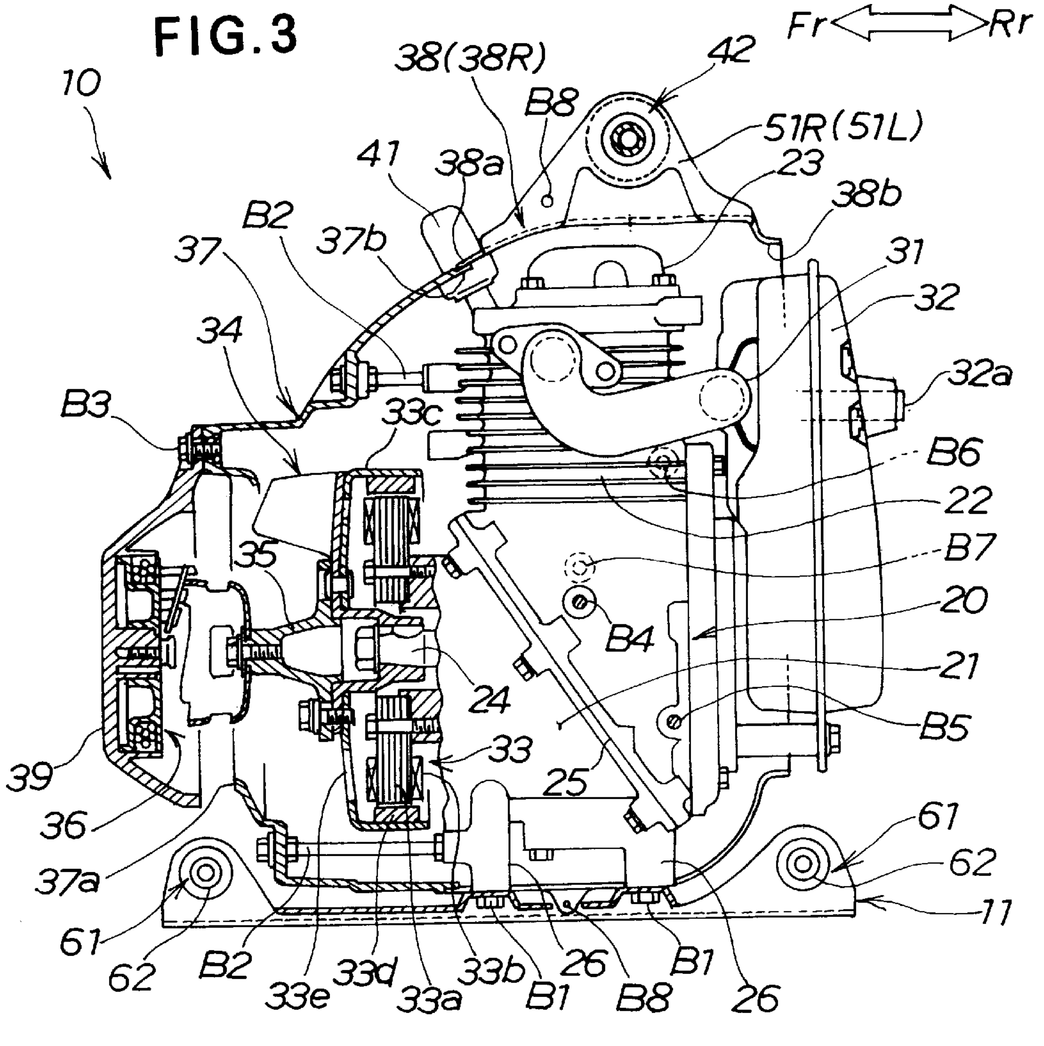
FIG. 3 is a side view, with parts in cross section, of a generator unit of the portable generator shown in FIG. 2.
Figure 4:
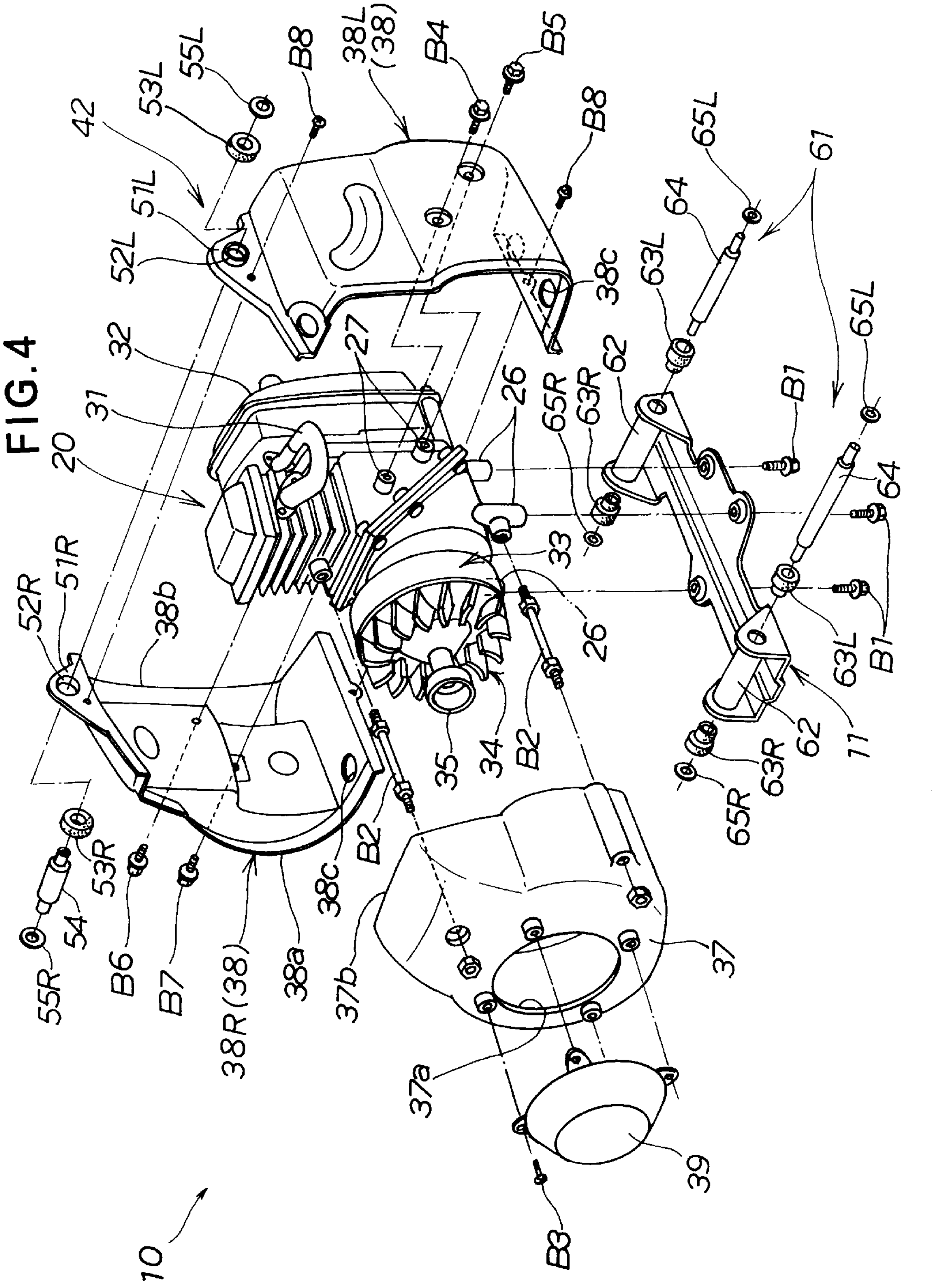
FIG. 4 is an exploded perspective view of the generator unit shown in FIG. 3.

FIGS. 3 and 4 show in detail the structure of the generator unit 10. As shown in these figures, the generator unit 10 generally comprises an engine 20, a base 11 for supporting thereon the engine 20, a muffler 32 connected through an exhaust pipe 31 to the engine 20, a generator body 33 assembled with the engine 20, a cooling fan 34 assembled with the generator body 33 and rotatable for drawing outside air, a recoil starter 36 connected by a connecting shaft 35 to the cooling fan 34, a fan cover 37 surrounding the generator body 33 and the cooling fan 34, and a cooling and ventilating shroud 38 covering or enclosing the engine 20 and a part of the muffler 32.

The base 11 is comprised of an elongated rectangular steel plate and secured by three bolts B1 to three legs 26 (two bearing shown) provided on the bottom of the engine 10. The base 11 has a pair of tubular members 62, 62 carried on its front and rear end portions for a purpose described below.

The engine 20 is a single cylinder valve-in-head engine and includes a crankcase 21, a cylinder block 22 and a head cover 23 assembled together. The engine 20 has an output shaft 24 extending horizontally. The crankcase 21 and the cylinder block 22 are bolted together along flanged mating surfaces 25 (FIG. 3) extending obliquely to an axis of the output shaft 24.

The muffler 32 has a generally box-like shape and is attached to a rear face of the cylinder block 22. The muffler 32 has an exhaust port 32*a* opening at a rear surface thereof.

The generator body 33 is a permanent-magnet outer rotor generator or magneto having an outer rotor 33*c* driven for rotation by the engine 20. Thus, the portable generator 1 is an engine-driven generator.

The generator body 33 includes a core 33*a* mounted to the cylinder block 22, a plurality of coils 33*b* wound around the core 33*a*, the aforesaid outer rotor 33*c* having a cup-shaped configuration and mounted on the output shaft 24 of the engine 20, and a plurality of permanent magnets 33*d* fixed to an inner circumferential surface of the cup-shaped outer rotor 33*c*.

The outer rotor 33*c* is designed to surround the core 33*a* and the coils 33*b*, and the cooling fan (fan rotor) 34 is carried on a front face of the outer rotor 33*c*. Since the outer rotor 33*c* to which the cooling fan 34 is attached is highly rigid and has a large diameter, the cooling fan 34 is allowed to have a large diameter and can be easily and reliably attached to the outer rotor 33*c*. The use of such large-diameter cooling fan 34 enable creation of a large quantity of air which is sufficient to cool the engine 20 and the generator body 33. Additionally, because the outer rotor 33*c* serves also as a flywheel of the engine 20, no separate flywheel is needed. The internal space of the sound insulating case 2 can, therefore, be reduced correspondingly, enabling downsizing of the portable generator 1 (FIG. 1).

The output shaft 24 of the engine 20, the outer rotor 33*c*, the cooling fan 34, and the recoil starter 36 are coaxial with each other. The outer rotor 33*c* has a ventilating hole 33*e*.

The fan cover 37 has a generally bowl-like shape and is attached to the engine 20 (more particularly, the crankcase 21 and the cylinder block 22) by a plurality of stud bolts B2. The bowl-shaped fan cover 37 has a circular air inlet 37*a* at the bottom (left end in FIGS. 3 and 4) for introducing air into thea fan cover 37, and a recoil starter supporting cap 39 attached to the fan cover 37 in front of the air inlet 37*a*, there being a clearance (not designated) between the recoil starter supporting cap 39 and the fan cover 37 so that the air can be drawn into the fan cover 37 through the clearance and the air inlet 37*a* connected to the clearance. The bowl-shaped fan cover 37 has an air outlet 37*b* at the open top end (right end in FIGS. 3 and 4) for letting the air out from the fan cover 37. The air outlet 37*b* is directly connected to an inlet 38*a* of the shroud 38 by a fit joint formed between the open right end of the fan cover 37 and an open inlet side end left end in FIGS. 3 and 4) of the shroud 38.

To secure efficient cooling of the engine 20 inside the sound insulating case 2 (FIG. 2) while providing enhanced sound insulating effect, the shroud 38 is so designed as to cover or enclose at least the crankcase 21 and the cylinder block 22 of the engine 20, and preferably substantially the whole body of the engine 20 as in the illustrated embodiment. The shroud 38 is formed from a steel plate and has high stiffness properties. The engine 20 is directly mounted to such stiff shroud 38 by means of a plurality of screws B4, B5, B6 and B7 in such a manner that it is accommodated within the shroud 38. Reference numeral 41 shown in FIG. 3 denotes a spark plug mounting socket.

The generator unit 10 has a hanger portion 42 at the top and a pair of front and rear base mounting portions 61, 61 at the bottom.

Referring back to FIG. 2, the hanger portion 42 of the shroud 38 is connected to a reinforced mounting portion 4*a* (root or base of the carrying handle 4) at a rear end of the inverted U-shaped carrying handle 4. The reinforced mounting portion 4*a* supports the generator unit 10 via the shroud 38 which serves also as a hanger for the generator unit 10.

The base 11 is attached to a lower portion of the case 2 via the base mounting portions 61, 61 so that the weight of the generator unit 10 is born by the lower portion of the case 2.

An exhaust duct 44 is attached to an exhaust hole 45 formed at a rear end of the case 2 and covers or encloses a part of the muffler 32. The exhaust duct 44 has a rear wall formed with a multiplicity of vent holes comprised of slits 44*a* for venting the air from the case 2, and an engine exhaust opening 44*b* for discharging the engine exhaust gases emitted from the exhaust port 32*a* of the muffler 32.

Figure 5:
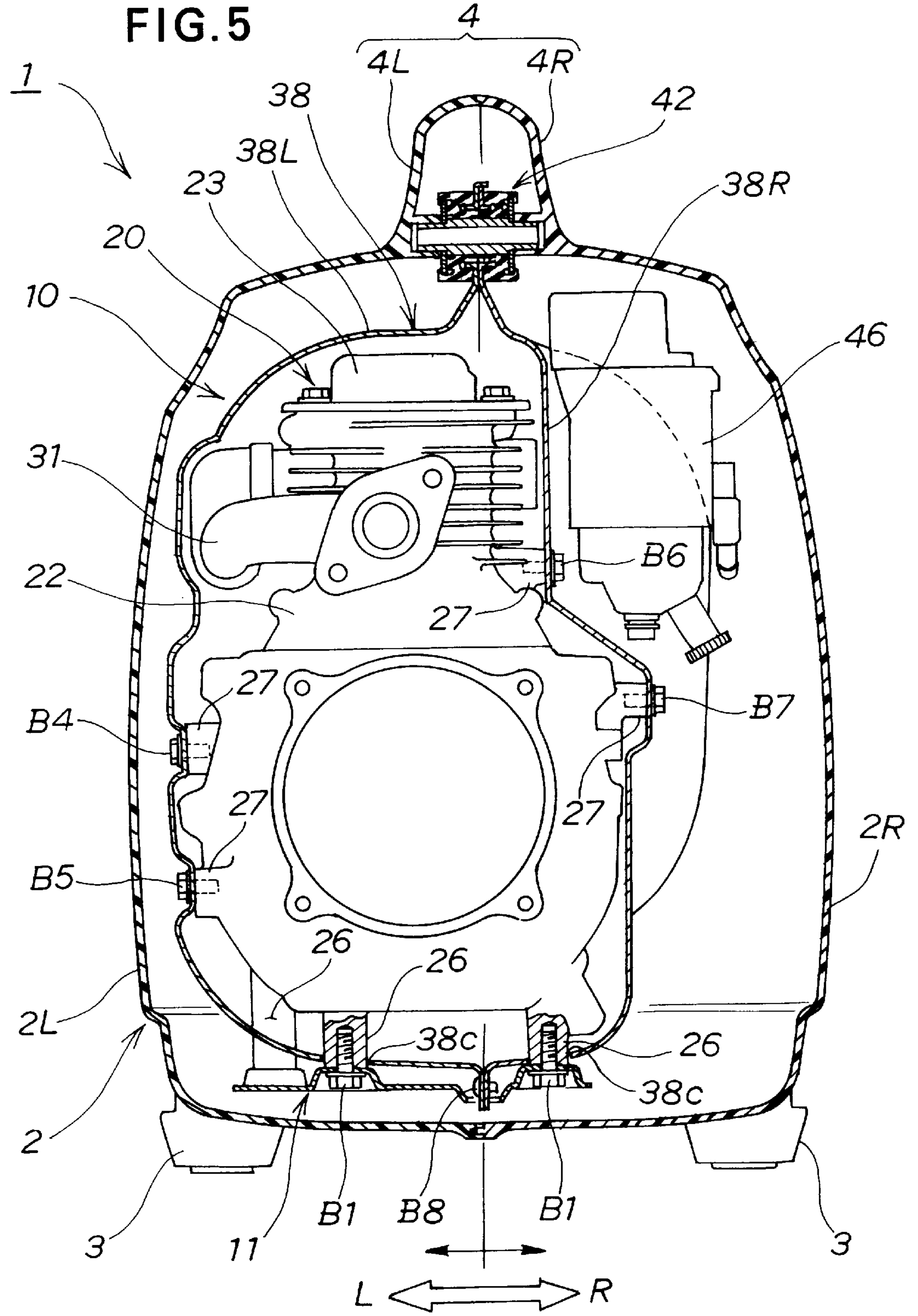
FIG. 5 is an enlarged cross-sectional view taken along line V—V of FIG. 2.

As shown in FIG. 5, the shroud 38 is a split two-piece shroud composed of right and left shroud halves or members 38R and 38L which can be separated in the widthwise direction along a longitudinal central parting line contained in a vertical plane. The right and left shroud members 38R, 38L have respective top and bottom portions mated together face to face and fastened together by a pair of screws B8, B8 (an upper one of the screws B8 being shown in FIG. 3). To secure the engine 20 inside the shroud 38, part of a sidewall of the shroud 38 is fastened by the screws B4, B5, B6, B7 to plural internally threaded projections 27 formed on the cylinder block 22 of the engine 20. Since the shroud 38 of steel plate has a large heat-transfer coefficient (thermal conductivity), and since the engine 20 is directly attached to the shroud 38, heat from the engine 20 while running can be smoothly and rapidly transferred to the shroud 38 and radiated therefrom. The shroud 38 is received in the case 2 with its hanger portion 42 attached to the case 2. In FIG. 5 designated by 46 is a carburetor equipped with a governor.

Figure 6:
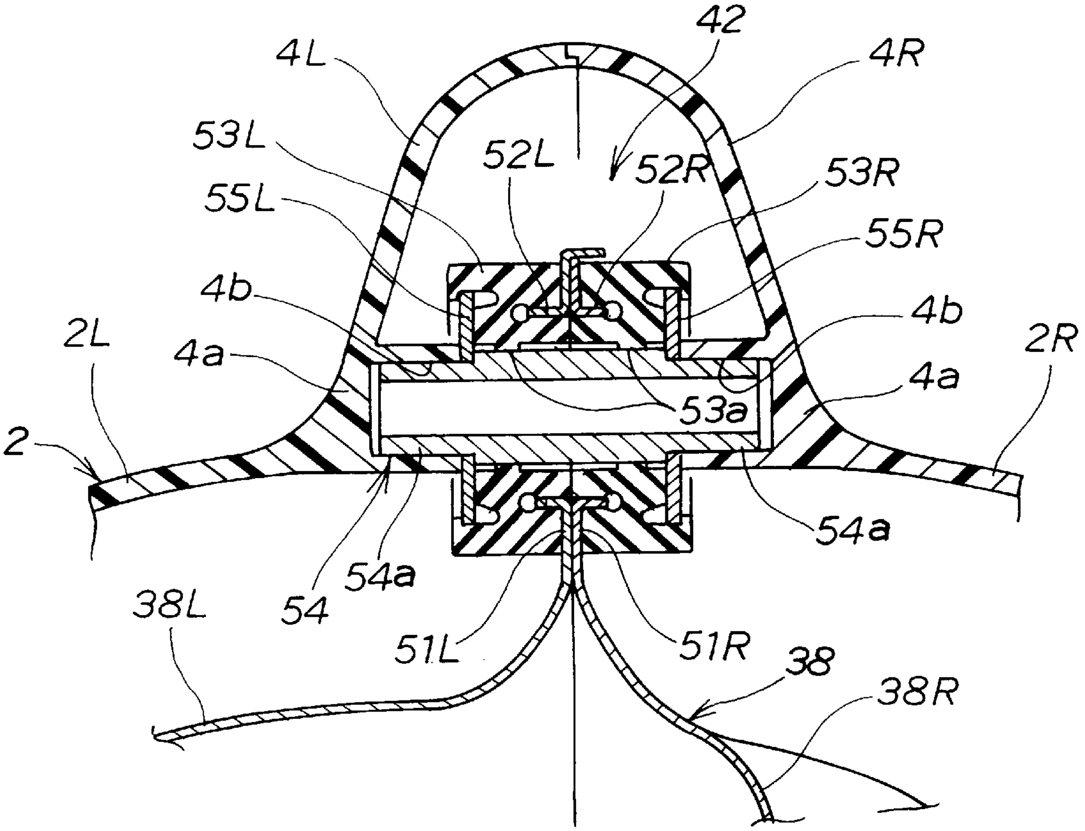
FIG. 6 is an enlarged cross-sectional view showing a shroud hanger attachment structure shown in FIG. 5.

FIG. 6 shows an attachment structure of the hanger portion 42 of the shroud 38. As shown in this figure, the hanger portion 42 is attached to the case 2 by gripping the hanger portion 42 between the right and left handle members 4R, 4L at the reinforced mounting portion 4*a* formed by the root of the carrying handle 4.

More specifically, the hanger portion 42 includes a right hanging strip or lug 51R extending upwardly from an upper end portion of the right shroud member 38R, an annular right retaining portion 52R integral with the right hanging lug 51R and projecting therefrom in a lateral outward direction, an annular first right vibration-proof member 53R press-fitted with the right retaining portion 52R, a left hanging strip or lug 51L extending upwardly from an upper end portion of the left shroud member 38L, an annular left retaining projection 52L integral with the left hanging lug 51L and projecting therefrom in a lateral outward direction, an annular first left vibration-proof member 53L press-fitted with the left retaining projection 52L, a horizontal hanging pin 54 press-fitted in central holes 53*a* of the right and left vibration-proof members 53R, 53L while the right and left hanging lugs 51R, 51L are kept in face-to-face contact with each other, and a right washer 55R and a left washer 55L fitted around opposite end portions 54*a*, 54*a* of the hanging pin 54 to prevent the right and left vibration-proof members 52R, 52L from displacing off the right and left retaining projections 52R, 52L.

The opposite end portions 54*a*, 54*a* of the hanging pin 54 project from outer ends of the right and left vibration-proof members 53R, 53L. These end portions 54*a*, 54*a* serve as mounting legs for securing the generator unit 10 to the case 2 through the first vibration-proof members 53R, 53L, and so they are hereinafter referred to as "first legs 54*a*, 54*a* ".

The right and left handle members 2R, 2L each have an integral tubular socket portion 4*b* projecting interiorly and horizontally from the reinforced mounting portion 4*a* for snugly receiving therein one of the first legs 54*a*, 54*a*.

In assembly, the socket portions 4*b*, 4*b* are forced to fit over the first legs 54*a*, 54*a*, so that the right and left hanging lugs 51R, 51L are supported by the socket portions 4*b*, 4*b* via the hanging pin 54 and the first right and left vibration-proof members 52R, 52L in such a manner that the hanging lugs 51R, 51L are gripped between opposed front ends of the socket portions 4*b*, 4*b* via the washers 55R, 55L and the vibration-proof members 53R, 53L. Thus, the case 2 can stably support the generator unit 10 (FIG. 5) by gripping the generator unit 10 via the vibration-proof members 53R, 53L.

The first right and left vibration-proof members 53R, 53L are formed from an elastic material such as rubber. Since the respective upper end portions of the right and left shroud members 38R, 38L of the shroud 38 are mounted to the case 2 via the first right and left vibration-proof members 53R, 53L, vibrations generated by the engine 20 (FIG. 5) while running are damped at an upper portion of the shroud 38 by means of the first right and left vibration-proof members 53R, 53L.

According to a modification of the present invention, the hanger portion 42 of the shroud 38 may be attached to the case 2 by fitting together the socket portions 4*b*, 4*b* of the case 2 and the first legs 54*a*, 54*a* of the hanger pin 54 with the first right and left vibration-proof members 53R, 53L each disposed between one of the socket portions 4*b*, 4*b* and a corresponding one of the legs 54*a*, 54*a*. Additionally, the right and left vibration-proof members 53R, 53L may be integral with each other.

Figure 7:
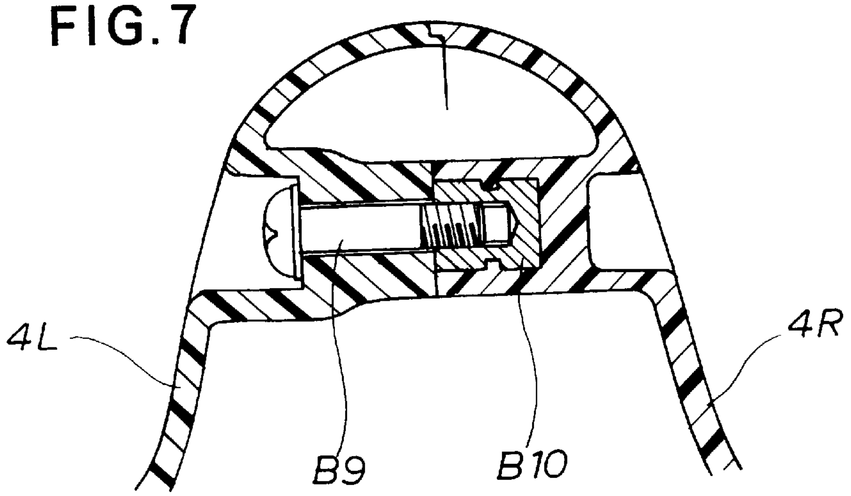
FIG. 7 is an enlarged cross-sectional view taken along line VII—VII of FIG. 2.

Referring now to FIG. 7, there is shown a joint structure between the right and left handle members 4R, 4L. The joint structure includes a threaded fastener composed of a screw B9 and a nut B10. The screw B9 extends through the left handle member 4L and is threaded into a nut B10 which is embedded in the right handle member 4R. The joint structure using the threaded fastener B9, B10 is formed at each of the rear and front end portions A, B (FIG. 1) of the carrying handle 4.

Figure 8:
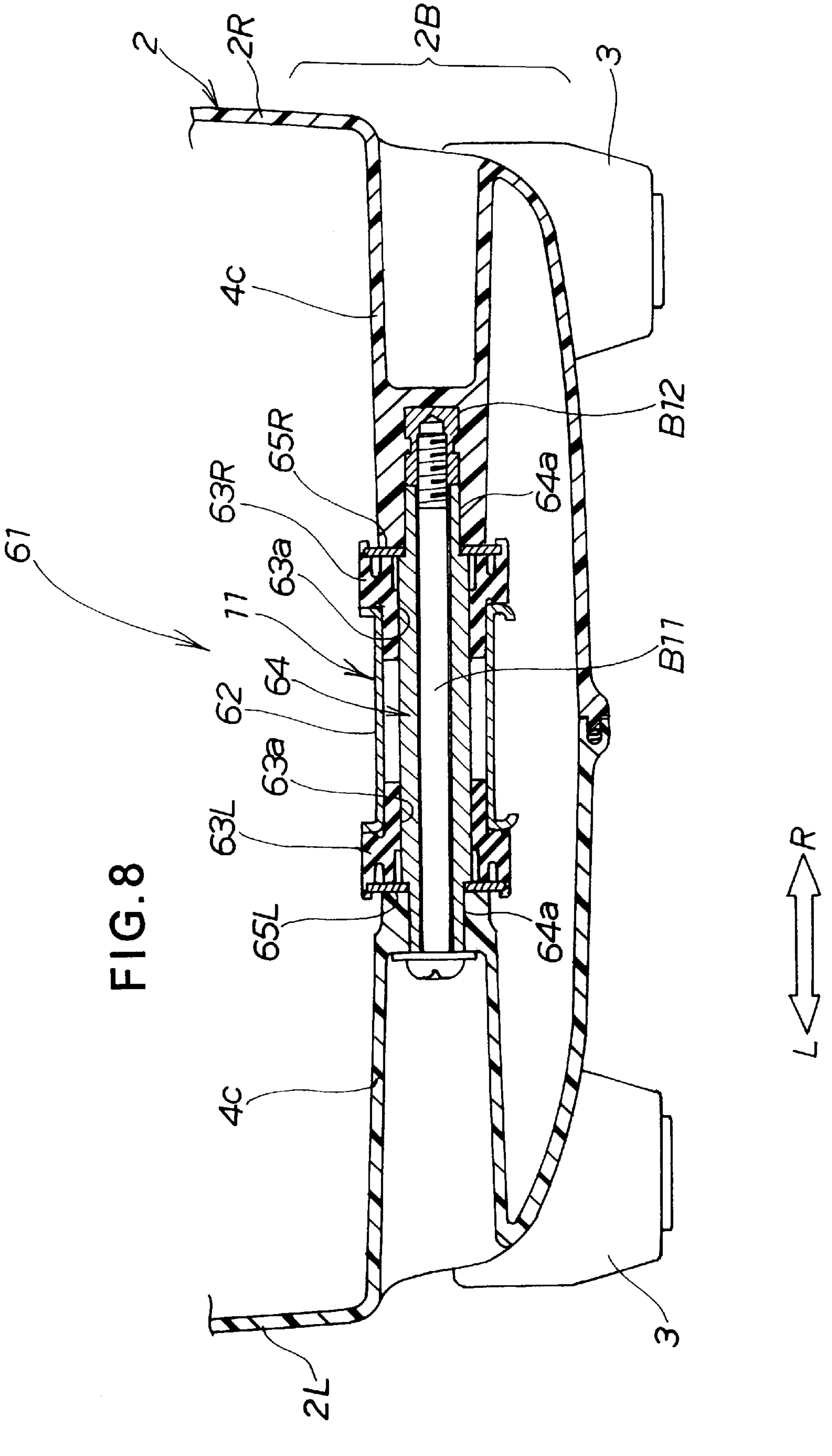
FIG. 8 is an enlarged cross-sectional view taken along line VIII—VIII of FIG. 2.

FIG. 8 shows in detail the structure of the base mounting portions 61, 61 shown in FIGS. 2 and 3. As shown in this figure, each of the mounting portions 61 is comprised of the tubular member 62 carried on, and extending transversely of, the base 11, a pair of annular second right and left vibration-proof members 63R, 63L press-fitted in the opposite ends of the tubular member 62, a hollow or tubular support pin 64 press-fitted in respective central holes 63*a*, 63*a* of the second right and left vibration-proof members 63R, 63L, and a right washer 65R and a left washer 65L fitted around opposite end portions 64*a*, 64*a* of the support pin 64 to prevent removal of the second right and left vibration-proof members 63R, 63L from fitting engagement with the tubular member 62 and the support pin 64.

The opposite end portions 64*a*, 64*a* of the support pin 64 project from outer ends of the second right and left vibration-proof members 63R, 63L. The opposite end portions 64*a*, 64*a* serve as mounting legs for securing the base 11 to the case 2 (FIG. 2) via the second vibration-proof members 63R, 63L, and so they are hereinafter referred to as "second legs 64*a*, 64*a* ".

The right and left case members 2R, 2L each have an integral tubular socket portion 4*c* extending interiorly and horizontally at a bottom portion 2B of the case 2 for fitting engagement with a corresponding one of the second legs 64*a*, 64*a* of the support pin 64. The bottom portion 2B has a relatively high stiffness.

In assembly, the socket portions 4*c*, 4*c* are forced to rit over the second legs 64*a*, 64*a*, so that the tubular member 62 is supported by the socket portions 4*c*, 4*c* via the support pin 64 and the second right and left vibration-proof members 63R, 63L in such a manner that the tubular member 62 is gripped between opposed front ends of the socket portions 4*c*, 4*c* via the washers 65R, 65L and the vibration-proof members 63R, 63L. Thus, the case 2 stably supports the generator unit 10 (FIG. 2) by gripping the generator unit 10 via the vibration-proof members 63R, 63L.

The second right and left vibration-proof members 63R, 63L are formed from an elastic material such as rubber. Vibrations generated from the engine 20 (FIG. 5) while running are damped at the bottom portion of the shroud 38 by means of the second right and left vibration-proof members 63R, 63L.

The base mounting portions 61 may be modified to include a pair of second right and left vibration-proof members (not shown) which are attached in advance to the socket portions 4*c*, 4*c*, respectively. The second legs 64*a*, 64*a* are fitted in the socket portions 4*c*, 4*c* with the vibration-proof members disposed therebetween.

The right and left case members 2R, 2L are joined together at the bottom portion 2B of the case by means of a threaded fastener which is composed of a screw B11 and a nut B12. The nut 12 is embedded in the socket portion 4*c* of the right case member 2R. The screw B11 extends through the socket portion 4*c* of the left case member 2L and the support pin 64 and is threaded into the nut B12 to fasten the right and left case members 2R, 2L. This joint structure using the threaded fastener B11, B12 is formed at each of the rear end and intermediate portions C, D (FIGS. 1 and 2) of the case 2.

Figure 9B:
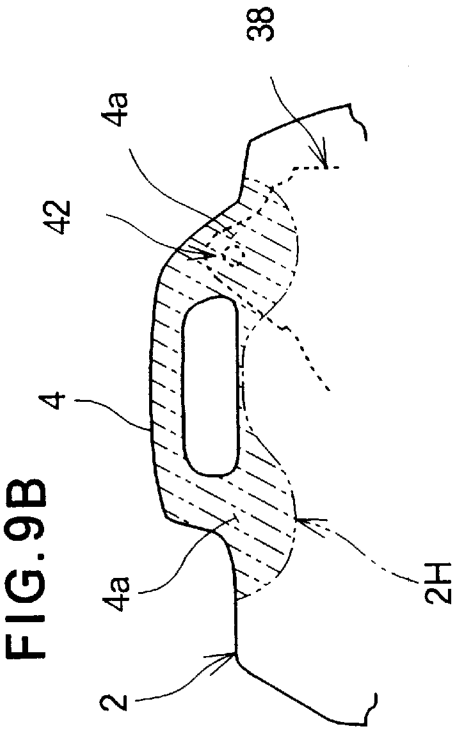
FIGS. 9A, 9B and 9C are diagrammatical views showing the relationship between a sound insulating case and the generator unit.
Figure 9A:
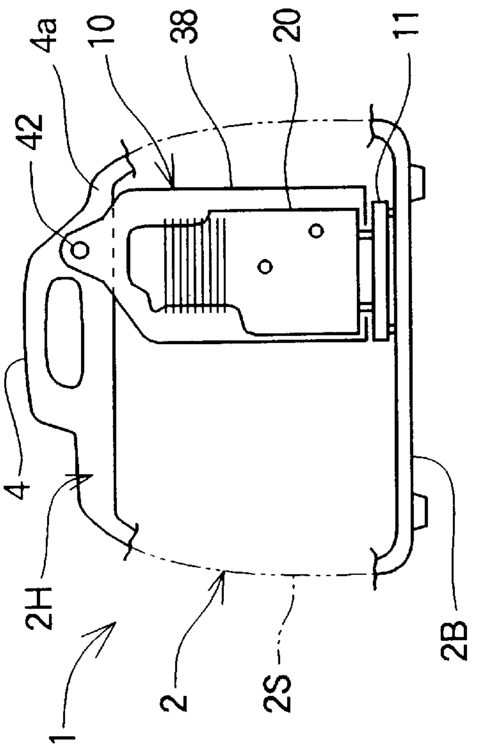
Figure 9C:
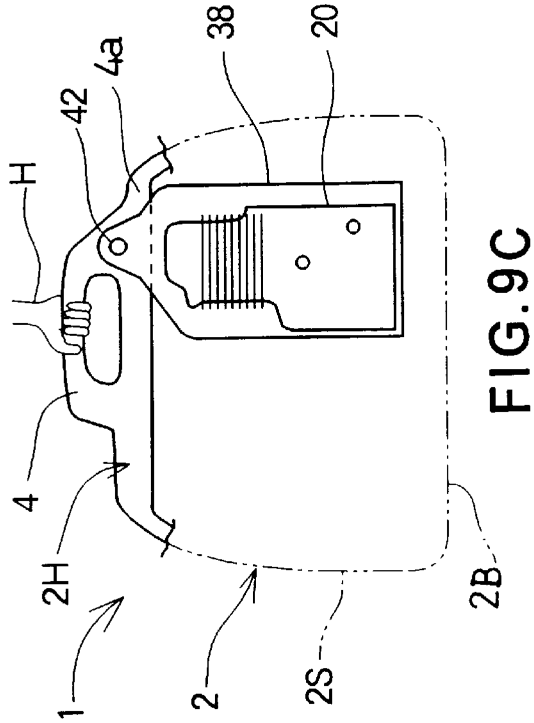

FIGS. 9A–9C show the relationship between the case 2 and the generator unit 10.

As shown in FIG. 9A, the generator unit 10 is mounted to the case 2 in such a way that the shroud 38 surrounding the engine 20 and bolted to opposite sides of the engine 20 is attached to the reinforced mounting portion 4*a* of the carrying handle 4, and the base 11 carrying thereon the engine 20 and bolted to the engine 20 is attached to the bottom portion 2B of the case 2 which has a relatively high stiffness.

As shown in FIG. 9B, a top portion 2H of the case 2 (including the carrying handle 4 and the reinforced mounting portions 4*a*, 4*a* of the handle 4), which is indicated by phantom-lined hatching, is made to have a higher stiffness than other portions because this portion 2H must sustain the weight of components, such as the shroud 38, the generator unit 10 and the like, hanging from the same portion 2H. Similarly, the bottom portion 2B (FIG. 9A) of the case 2 is made stiffer than other portions because it is subjected to the weight of components contained in the case 2.

As shown in FIG. 9C, when the user is carrying the portable generator 1 from one place to another with the carrying handle 4 gripped with its hand H, the weight of the generator unit 10 including the engine 20 mostly acts through the shroud 38 on the reinforced mounting portion 4*a* and thence on the carrying handle 4. The shroud 38 has a high stiffness and serves also as a support member (hanger) for supporting or hanging the engine 20 from the reinforced mounting portion 4*a*. With this mounting structure, a side portion 2S of the case 2 is not so requested to bear the weight of the generator unit 10.

As is apparent from the foregoing description, when the portable generator 1 is being hand-carried by the user, most of the weight of the generator unit 10 including the engine 20 acts on the top and bottom portions 2H, 2B of the case 2. Taking this into consideration, the side portion 2S of the case 2 may be constructed to have only a small stiffness. There is no need to increase the stiffness throughout the whole body of the case 2, and so considerable weight reductions of the case 2 become possible. Additionally, the portable generator 1 of the present invention, as opposed to the conventional apparatus, requires no frames to hold the case 2 and, hence, is free from limitations resulting from the presence of the frames. Thus, the case 2 has a high degree of flexibility not only in terms of the geometric design but also in terms of the selection of materials used.

Additionally, because at least the crankcase 21 and the cylinder block 22 of the engine 20 are covered or shrouded doubly by the shroud 38 and the case 2, an enhanced sound-insulating effect can be obtained.

Furthermore, since the shroud 38 doubles in function as a shroud for cooling and ventilating the engine 20 and also as a support member (hanger) of the engine 20, the internal structure of the portable generator 1 can be simplified.

Figure 10:
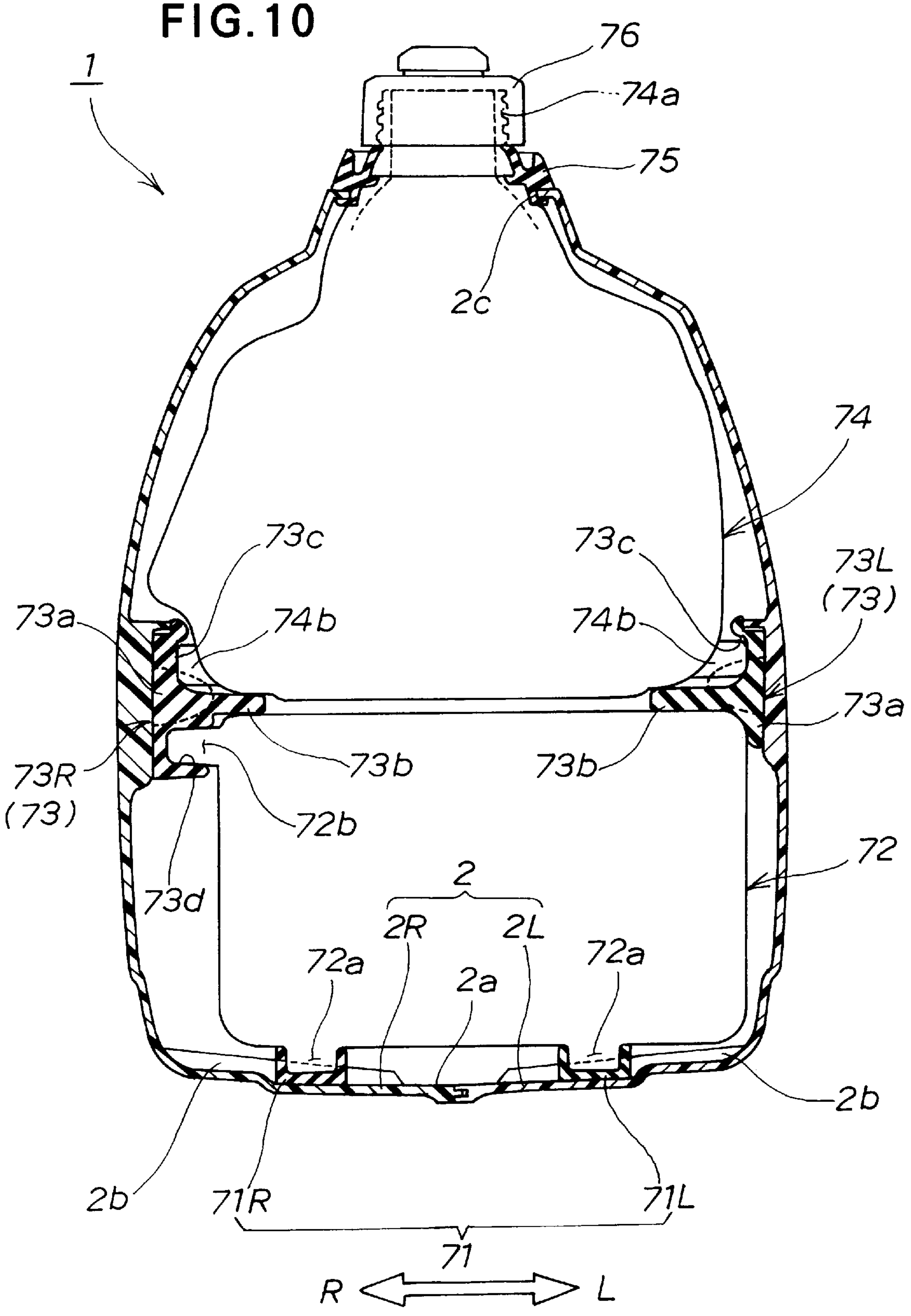
FIG. 10 is an enlarged cross-sectional view taken along line X—X of FIG. 2.

Referring now to FIG. 10, there is shown the control unit accommodating box 72 and the fuel tank 74 stably held in position within the case 2.

As shown in FIG. 10, a pair of right and left lower cushion members 71R, 71L is disposed on a bottom surface 2*a* of the case 2 for supporting thereon the control unit accommodating box 72. An intermediate cushion member 73 (composed of a right piece 73R and a left piece 73L separated from each other) is associated with upper right and left corner portions of the control unit accommodating box 72. The intermediate cushion member 73 supports thereon the fuel tank 74. The fuel tank 74 has a tubular fuel filler port 74*a* formed at its upper end and projecting upwardly and outwardly from an upper portion of the case 2.

The control unit accommodating box 72 is a relatively stiff rectangular box and accommodates within it a control unit (not shown) for controlling the engine 20 and generator body 33 shown in FIG. 2. The control unit accommodating box 72 (hereinafter referred to as "accommodating box") has a pair of right and left legs 72*a*, 72*a* at the bottom and a positioning lateral projection 72*b* at an upper right corner. The right and left legs 72*a*, 72*a* are mounted on the bottom surface 2*a* of the case 2 via the lower cushion members 71R, 71L. More specifically, the legs 72*a*, 72*a* carrying thereon the lower cushion members 71R, 71L are fitted in a pair of aligned guide grooves 2*b*, 2*b* formed transversely in the bottom surface 2*a* of the case 2. The legs 72*a*, 72*a* and the lower cushion members 71R, 71L are movable along the guide grooves 2*b*, 2*b* so that the position of the accommodating box 72 relative to the case 2 can be adjusted in the transverse direction of the case 2.

The fuel tank 74 further has a pair of positioning projections 74*b* formed integrally with and projecting horizontally from lower right and left corners of the fuel tank 74. An annular upper cushion member 75 is fitted around a root or base portion of the fuel filler port 74*a*. A filler cap 76 is attached to an upper end of the fuel filler port 74*a* to close the fuel filler port 74*a*.

The case 2 has an upper hole 2*c* formed at mating surfaces of the right and left case members 2R, 2L. The upper cushion member 75 is also fitted in the upper hole 2*c* so that the fuel filler port 74*a* is supported by an inner edge of the upper hole 2*c* with the upper cushion member 75 disposed therebetween.

The right piece 73R of the intermediate cushion member 73 is attached by press-fitting to a portion of the inner surface of a sidewall of the right case member 2R. Similarly, the left piece 73L of the intermediate cushion member 73 is attached by press-fitting to a portion of the inner surface of a sidewall of the left case member 2L. A joint structure between the right and left intermediate cushion member pieces 73R, 73L and the right and left case members 2R, 2L will be described below.

The right and left intermediate cushion member pieces 73R, 73L have a generally T shape including a vertical base portion 73*a* and a horizontal wing portion 73*b*. These pieces 73R, 73L are arranged such that the respective wing portions 73*b*, 73*b* confront each other in a horizontal plane.

The opposed horizontal wing portions 73*b*, 73*b* are disposed between an upper surface of the accommodating box 72 and a lower surface of the fuel tank 74. A total weight of the accommodating box 72 and fuel tank 74 is applied via the lower cushion members 71R, 71L and the horizontal wing portions 73*b*, 73*b* to the bottom portion 2B (FIG. 8) of case 2 which is made stiffer than other portions.

The vertical base portion 73*a* of the right intermediate cushion member piece 73R has formed therein an upper recessed portion 73C for positioning the fuel tank 74, and a lower recessed portion 73*d* for positioning the accommodating box 72. The left intermediate cushion member piece 73L has a recessed portion 73*c* formed in the vertical base portion 73*a* for positioning the fuel tank 74.

The base portion 73*a* of the left intermediate cushion member piece 73L is held in direct contact with a left side surface of the accommodating box 72, and the lower recessed portion 73*d* of the right intermediate cushion member piece 73R is fitted with the positioning projection 72*b* of the accommodating box 72 so that the right and left case members 2R, 2L can stably hold the accommodating box 72 in position by gripping the accommodating box 72 at the upper right and left corners via the right and left intermediate cushing member pieces 73R, 73L.

Similarly, the recessed portions 73*c*, 73*c* of the right and left intermediate cushion member pieces 73R, 73L are fitted with the right and left positioning projections 74*b*, 74*b* of the fuel tank 74 so that the right and left case members 2R, 2L can stably hold the fuel tank 74 in position by gripping the fuel tank 74 at the lower right and left corners via the right and left intermediate cushing member pieces 73R, 73L.

The lower cushion members 71R, 71L (71), intermediate cushion member 73 (73R, 73L) and upper cushion member 74 are made from an elastic material such as rubber.

As appears clear from the foregoing description, the accommodating box 72 holding therein the control unit (not shown) is carried via the lower cushion members 71R, 71L on the bottom portion 2B (FIG. 8) of case 2 which is made stiffer than other portions of the case 2, and fuel tank 74 is mounted on the accommodating box 72 via the intermediate cushion member 73. By using such simple two-storied arrangement, the fuel tank 72 (which becomes heavy when filled) can be readily accommodated within an upper part of the case 2. Additionally, the fuel filler port 74*a* projecting from an upper portion of the case 2 insures easy filling of the fuel to the fuel tank 74 accommodated within the case 2.

The weight of the fuel tank 71 is applied to the bottom surface 2*a* of the bottom portion 2B (FIG. 8) through the intermediate cushion member 73, the relatively stiff accommodating box 72 and the lower cushion member 71. Since the weight of the fuel tank 74 is born by the relatively stiff accommodating box 72, and since vibrations and shocks are damped by the lower and intermediate cushion members 71, 73, there is no strong need to increase the stiffness of the whole body of the case 2. Instead, partial stiffening of the case 2, as done at the top and bottom portions 2H and 2B (FIG. 9A), is satisfactory, which enables considerable reductions in weight of the case 2 and provides a higher degree of flexibility in designing the geometric shape of the case 2 and selecting materials used for the case 2, as compared to the conventional structural means taken to increase the stiffness of the case.

The right and left cover members 2R, 2L concurrently grip the opposite sidewalls of the accommodating box 72 and opposite sidewalls of the fuel tank 74 through the right and left intermediate cushion member pieces 73R, 73L, so that the accommodating box 72 and the fuel tank 74 are stably held in position within the case 2. Since the accommodating box 72 and the fuel tank 74 are automatically brought to a final attachment position when they are gripped as just described above, an attachment structure of the accommodating box 72 and fuel box 74 relative to the case 2 is very simple in construction. Furthermore, horizontal vibrations and shocks tending to act on the accommodating box 72 and the fuel tank 74 are sufficiently damped by the right and left intermediate cushion member pieces 73R, 73L.

At the upper hole 2*c* of the case 2, the fuel filler port 74*a* of the fuel tank 74 is gripped by the right and left case member 2R, 2L with the upper cushion member 75 disposed between the fuel filler port 74*a* and the inner edge of the upper hole 2*c*. Thus, the fuel tank 74 is stably and reliably attached to the case 2.

Figure 11:
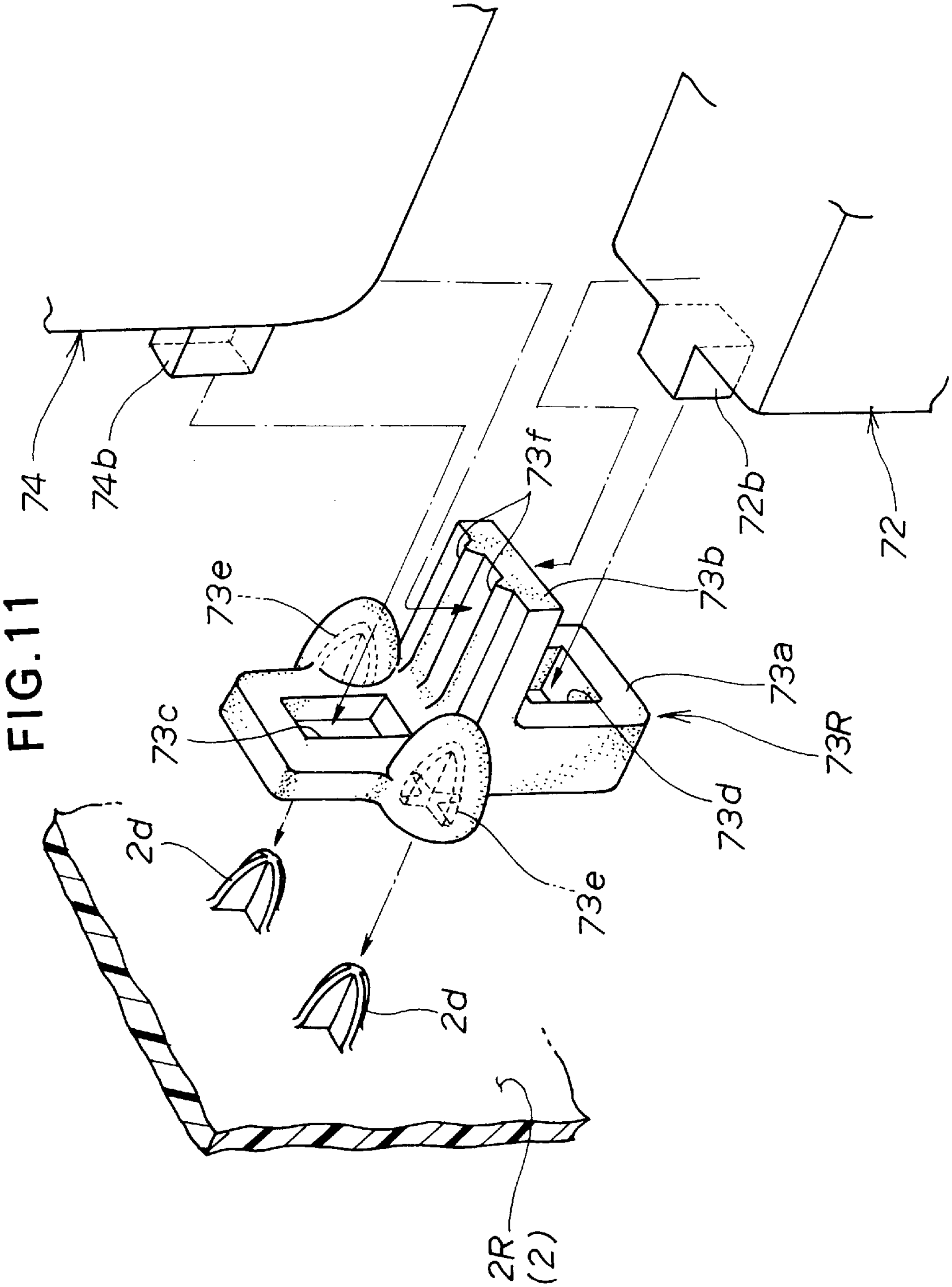
FIG. 11 is an exploded perspective view of a right intermediate cushion member piece and its peripheral components shown in FIG. 10.

Referring now to FIG. 11, there is shown in exploded perspective a joint structure used for attaching the right intermediate cushion member 73R to the right cover member 2R shown in FIG. 10.

The right cover member 2R includes pair of spaced retaining projections 2*d*, 2*d* projecting perpendicularly from an inside surface of the cover member 2R. The retaining projections 2*d*, 2*d* are tapered and each have four radial wings arranged in the shape of a cross like a tip of a Phillips driver.

The right intermediate cushion member piece 73R has a pair of spaced locking recesses 73*e*, 73*e* adapted to be press-fitted with the retaining projections 2*d*, 2*d*. To this end, the locking recesses 73*e*, 73*e* are complementary in contour to the retaining projections 2*d*, 2*d*. The locking recesses 73*e*, 73*e* and the retaining projections 2*d*, 2*d* are press-fitted with each other to attach the right intermediate cushion member piece 73R to the right case member 2R.

The right intermediate cushion member piece 73R has a pair of parallel spaced ribs 73*f* formed integrally with an upper surface of the horizontal wing portion 73*b*. The ribs 73*f* are triangular in cross section and has a ridge of an acute angle. The ribs 73*f* support thereon a lower surface of the fuel tank 74 and they are elastically deformable to an extent proportional to the quantity of fuel held in the fuel tank 74.

A joint structure used for attaching the left intermediate cushion member 73L (FIG. 10) to the left cover member 2L (FIG. 10) is the same as the joint structure just described above with reference to FIG. 11, and a further description thereof can be omitted.

Figure 12:
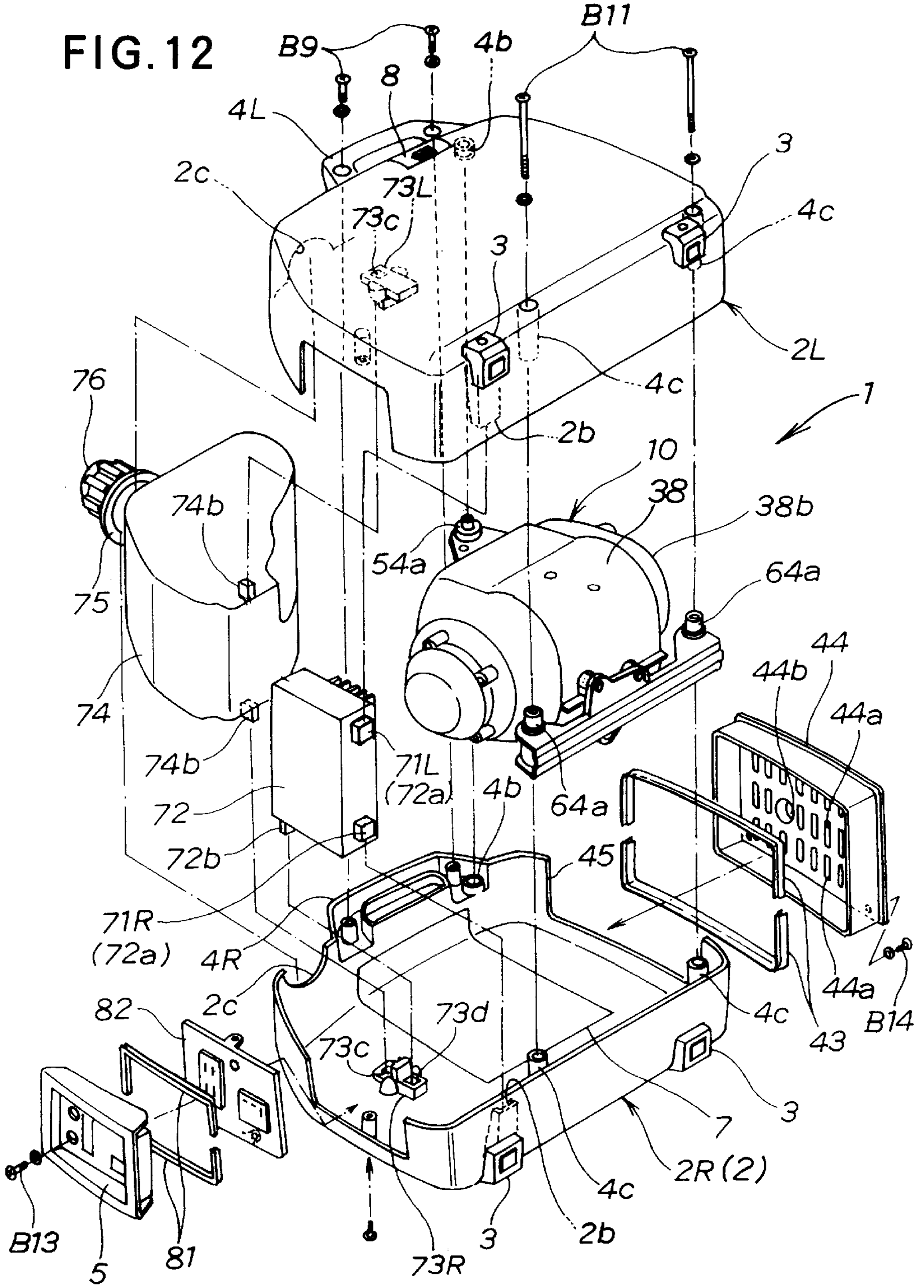
FIG. 12 is an exploded perspective view illustrative of the manner in which the portable generator of FIG. 2 is assembled.

A sequence of processing steps taken to assemble the portable generator 1 of the foregoing construction will be described with reference to FIG. 12. The processing steps should be construed as illustrative and not restrictive.

At first, the right case member 2R having a inner inner control panel 82 screwed thereto in advance is set in an assembling site with the inside surface of the sidewall (or the mating surface) facing upwards. The right intermediate cushion member piece 73R is also attached in advance to the right cover member 2R.

Then, the generator unit 10 while kept in a half-rolled position above the right cover member 2R is placed down onto the right cover member 2R so that the right first leg 54*a* and the right second legs 64*a*, 64*a* of the generator unit 10 are fitted in the socket portions 4*b*, 4*c*, 4*c* of the right case member 2R.

Subsequently, the lower cushion members 71R, 71L are fitted over the legs 72*a*, 72*a* of the accommodating box 72.

Thereafter, the accommodating box 72 while kept in a half-rolled position above the right cover member 2R is placed down onto the right cover member 2R such that the right lower cushion member 71R is fitted into the positioning groove 2*b* of the right case member 2R, and the positioning projection 72*b* of the accommodating box 72 is fitted in the recessed portion 73*d* of the right intermediate cushion member piece 73R.

Then, the fuel tank 74 while kept in a half-rolled position above the right cover member 2R is placed down onto the right cover member 2R such that the positioning projection 74*b* of the fuel tank 74 is fitted in the recessed portion 73*c* of the right intermediate cushion member piece 73R.

Subsequently, the left cover member 2L having the left intermediate cushion member piece 73L attached thereto in advance is placed down onto the right cover member 2R while the inside surface of the sidewall (or the mating surface) of the left cover member 2L facing downwards.

Thereafter, the left cover member 2L is mated with the right cover member 2R such that the left first leg 54*a* and the left second legs 64*a*, 64*a* of the generator unit 10 are fitted into the socket portions 4*b*, 4*c*, 4*c* of the left cover member 2L. During that time, the positioning groove 2*b* of the left cover member 2L fittingly receives therein the left lower cushion member 71L, and the left intermediate cushion member piece 73L is brought into abutment with the left sidewall of the accommodating box 72. In this instance, the recessed portion 73*c* of the left intermediate cushion member piece 73L is fitted with the positioning projection 74*b* of the fuel tank 74.

Then, the left and right case members 2L, 2R assembled together in superposed relation are fastened together by means of the screws B9, B9, B11, B11. The inner control panel 82 is firmly secured by a screw (not shown) to the left cover member 2L.

Subsequently, seal members 81 and the control panel 5 are placed over the inner control pane 82 through a front opening of the cover 2, and the control panel 5 is secured by a screw B13 to the inner control panel 82 with the seal members 81 disposed between the two panels 5, 82.

Then, seal members 43 are fitted on the exhaust duct 44 and after that the exhaust duct 44 is inserted into the exhaust hole 45 until it is fitted with the outlet 38*b* of the shroud 38 with the seal members 43 disposed therebetween. The exhaust duct 44 is secured by screws B14 (one being shown) to the case 2. A portable generator 1 of the present invention is thus completed.

As will be understood from the foregoing description, the portable generator 1 can be built up by merely assembling together the right case member 2R, the generator unit 10, the accommodating box 72, the fuel tank 74 and the left case member 2L from one direction in the order described above. Such unidirectional assembling operations do not involve, frequent changes in position and posture of the components which are tedious and time-consuming. Accordingly, the efficiency of the assembling process is very high.

Additionally, by virtue of the fitting engagement between the legs 54*a*, 64*a*, 64*a* of the generator unit 10 and the socket portions 4*b*, 4*c*, 4*c* of the right and left case members 2R, 2L, the right and left case members 2R, 2L and the generator unit 10 are temporarily assembled together with the generator unit 10 stably held therebetween. The number of portions to be joined together by screws can, therefore, be reduced and the assembling efficiency increases further.

Figure 13:
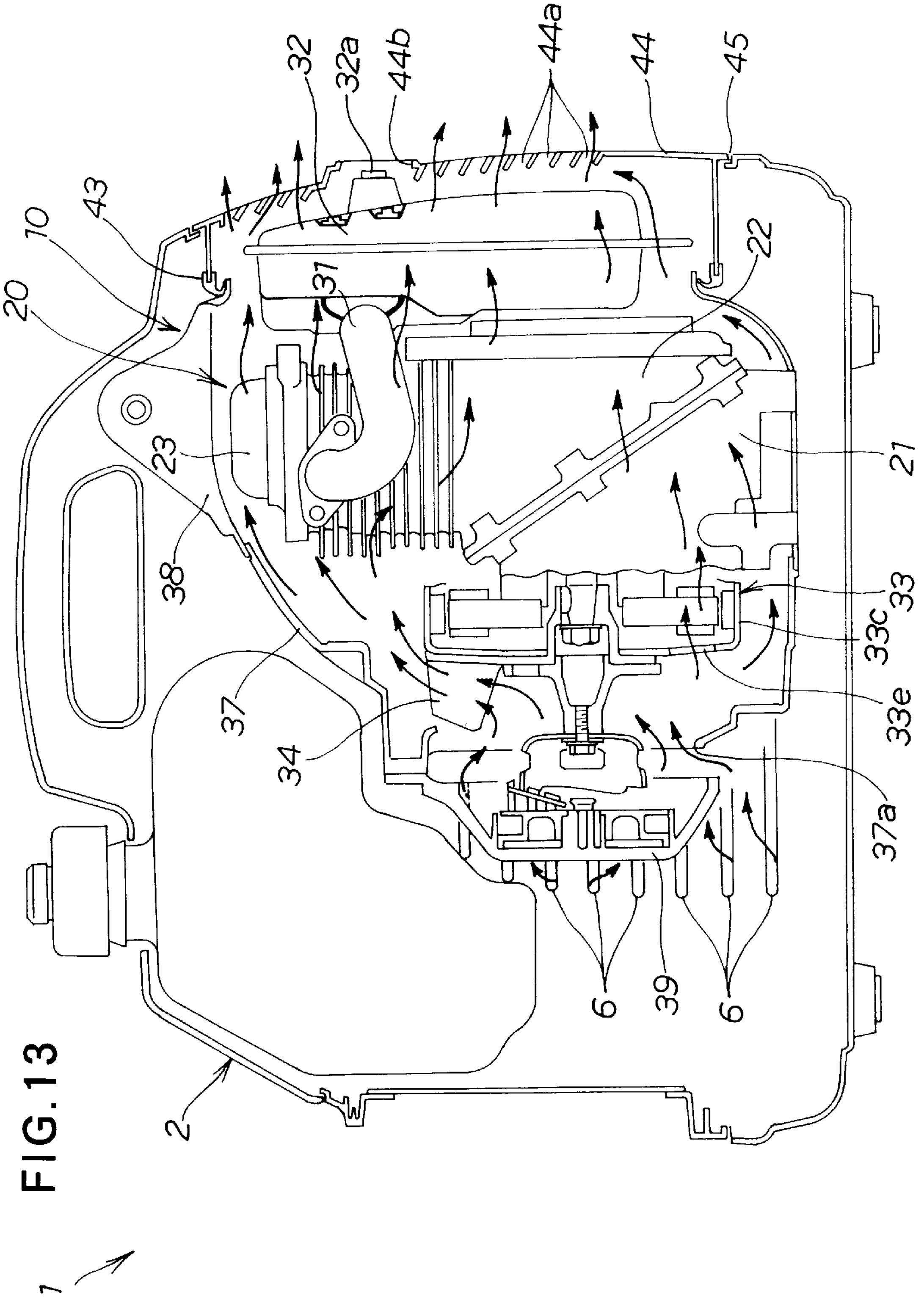
FIG. 13 is a diagrammatical view showing the flow of cooling air inside the portable generator shown in FIG. 2.

A cooling system of the portable generator 1 will be described with reference to FIG. 13.

When the engine 20 of the generator unit 10 is started, the generator body 33 begins to generate electric power. This causes the cooling fan 34 to rotate in unison with the outer rotor 33*c* of the generator body 33.

Rotation of the cooling fan 34 causes outside air to be drawn from the air inlets 6 into the case 2 and thence into the fan cover 37 through the air inlet 37*a*. The outside air is then forced or driven by the rotating cooling fan 37 to flow downstream through the fan cover 37, the shroud 38 and exhaust duct 44 to successively cool the generator body 33, the engine 20, the exhaust pipe 31 and the muffler 32. After cooling of the components 33, 20, 31, 32, the outside air is exhausted from the vent holes 44*a* (exhaust hole 45) of the exhaust duct 44.

The fan cover 35, shroud 38 and exhaust duct 44 connected end to end to form a single cooling passage. The cooling fan 34 is disposed in the cooling passage so that the outside air is drawn from the inlet 6, successively cools the generator body 33, engine 20, exhaust pipe 31 and muffler 32, and is finally exhausted from the exhaust hole 45 (vent holes 44*a*).

The cooling system composed of a single cooling passage formed by an in-line arrangement of the fan cover 34, shroud 38 and exhaust duct 44) and a single cooling fan 34 occupies only a small space within the case 2 and hence enables downsizing of the portable generator 1.

A noise source formed by the generator body 33 and the cooling fan 34 associated therewith is enclosed in the fan cover 37. Another noise source formed by the engine 20 is enclosed in the shroud 38. The fan cover 37 containing the first noise source and the shroud 38 containing the second noise source are received in the case 2. Thus, the noise sources are doubly sound-insulated. With this double sound-insulating structure, the noise-proofing properties of the portable generator 1 are very high.

Description given below is directed to the cooling capacity or power of the engine 20.

The shroud 38 made of metal (steel plate in the illustrated embodiment) is directly attached to the engine 20, as shown in FIG. 5. Heat of an outer wall of the engine 20 is, therefore, directly transferred to the metal shroud 38.

The metal shroud 38 directly attached to the engine 20 forms an effective radiating element and gives an additional heat-radiating surface to the engine 20. The engine 20 having such additional heat-radiating surface possesses a large cooling capacity or power and, hence, can be sufficiently cooled even when the cooling fan 34 is relatively small. Additionally, the use of the metal shroud 38 is contributive to the downsizing of the portable generator 1.

Figure 14:
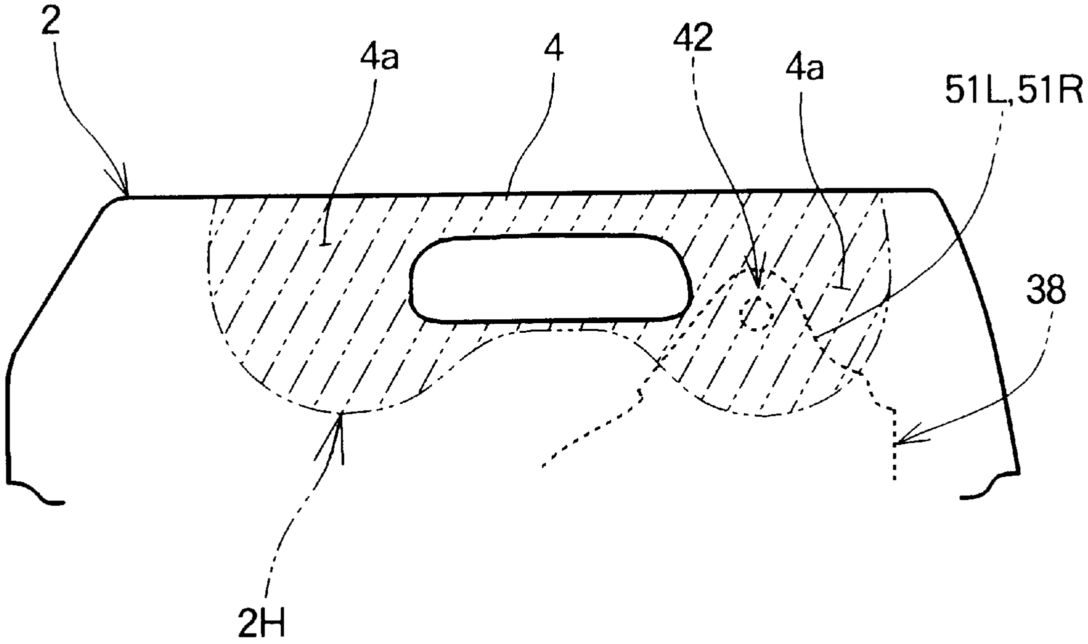
FIG. 14 is a fragmentary side view showing a modified form of the carrying handle of the portable generator shown in FIG. 1.

FIG. 14 shows a modified form of the case 2 according to the present invention. The modified case, which is also designated by 2, differs from the case 2 shown in FIGS. 1–13 only in that it includes a carrying handle 4 provided below an upper surface of the case 2 as a part of a body of the case 2. In this embodiment, the shroud 38 is attached to an upper case portion 2H (including the carrying handle 4 and the reinforced mounting portion 4*a* of the carrying handle 4) indicated by phantom-lined hatching for clarity. With this arrangement, the weight of the shroud 38 can be effectively supported even when the carrying handle 4 does not project from the upper surface of the case 2.

The metal shroud 38 which is directly attached to the case 2 to increase heat-radiating capacity or power of the engine 20 is preferably formed from a material having a large thermal conductivity (heat-transfer coefficient), such as a. steel sheet or an aluminum plate. A steel plate having large stiffness is much preferable from a load-bearing point of view because the engine 20 accommodated within the shroud 38 is heavy. The shroud 38 may be attached to a body of the carrying handle 4 rather than to the root (reinforced mounting portion) 4*a* of the handle 4.

Furthermore, the socket portions 4*b*, 4*c*, 4*c* of the case 2 and the legs 54*a*, 64*a*, 64*a* of the generator unit 10 may take another form as long as they can fit with each other. Additionally, the right lower cushion member 71R and the left lower cushion member 71L may be integral with each other.

Obviously, various minor changes and modifications of the present invention are possible in the light of the above teaching. It is therefore to be understood that within the scope of the appended claims the invention may be practiced otherwise than as specifically described.

What is claimed is:

1. A portable generator comprising:

an engine;

a generator body driven by said engine;

a sound insulating case accommodating said engine and said generator body and having a carrying handle; and a cooling and ventilating shroud surrounding at least a crankcase and a cylinder block of said engine, said shroud comprising a split shroud composed of a pair of right and left shroud halves, said engine being fixed to said split shroud, said split shroud having an upper joined portion and a lower joined portion, at least said upper joined portion being accommodated in and connected to said sound insulating case.

2. A portable generator according to claim 1, wherein each of said upper and lower joined portions of said split shroud is accommodated in and connected to said sound insulating case via a vibration-proof member.

3. A portable generator according to claim 1, wherein said split shroud is formed of a steel plate and said sound insulating case is formed of a synthetic resin.

4. A portable generator according to claim 2, wherein said split shroud is formed of a steel plate and said sound insulating case is formed of a synthetic resin.

5. A portable generator according to claim 1, wherein said sound insulating case includes a lower part having rigidity larger than that of the other part thereof.

6. A portable generator according to claim 1, wherein said generator body is disposed at an entrance side of said shroud, a muffler for said engine is disposed at an exit side of said shroud, said generator body comprises a magneto generator having an outer rotor driven by said engine, and said generator body includes a cooling fan mounted to said outer rotor for taking external air through an intake port of said case into said shroud and discharging the air from said case after cooling an outer periphery of said engine and then said muffler.

* * * * *